June 21, 1932. V. PANTENBURG 1,863,803
APPARATUS FOR THE REGENERATION OF ADSORPTION MATERIAL
Original Filed July 23, 1925
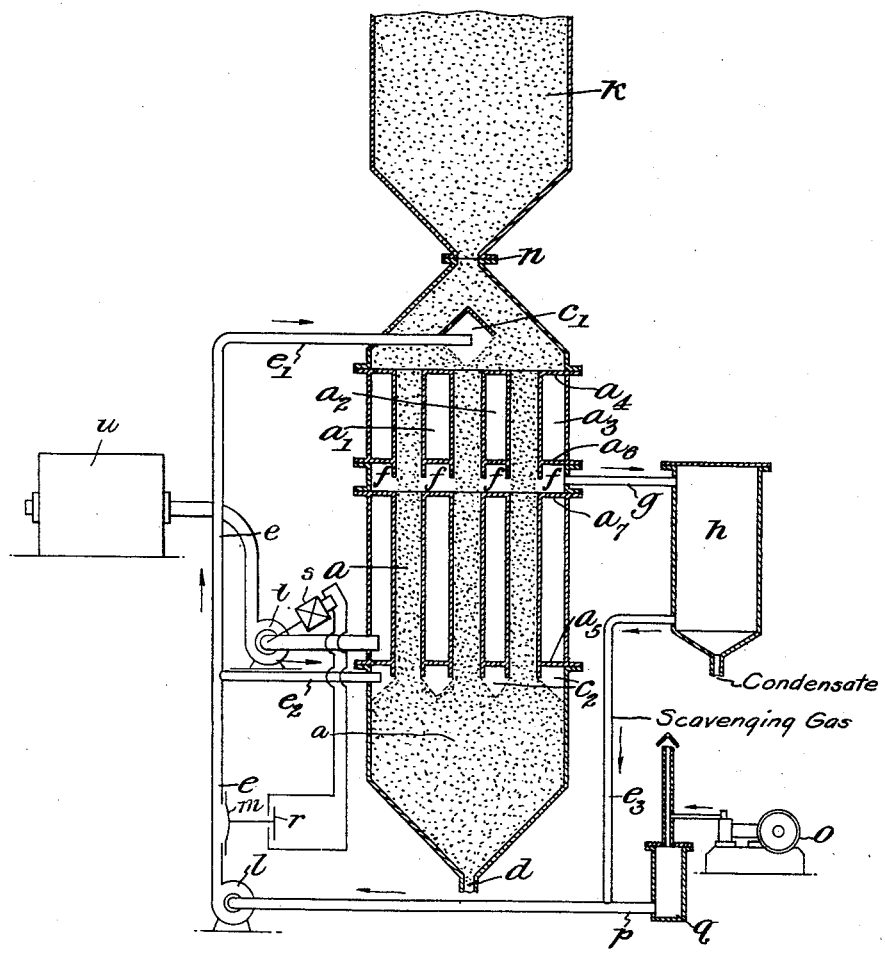

Patented June 21, 1932

1,863,803

UNITED STATES PATENT OFFICE

VITALIS PANTENBURG, OF HESSE NASSAU, GERMANY, ASSIGNOR TO AMERICAN LURGI CORPORATION, OF NEW YORK, N. Y., A CORPORATION OF NEW YORK

APPARATUS FOR THE REGENERATION OF ADSORPTION MATERIAL

Original application filed July 23, 1925, Serial No. 45,723, and in Germany November 12, 1924. Divided and this application filed January 13, 1928. Serial No. 246,561.

This invention relates to apparatus for regenerating adsorption materials, for instance activated carbon, gels or the like, and is a division of application Serial No. 45,723, filed July 23, 1925.

When charged adsorption materials are subjected to heat, the adsorbed substances, as is well known, are liberated and may be separated from the adsorption material so that the latter may be used again. Heat may be applied in various ways. It may be applied by externally heating the vessel containing the material to be regenerated or by heating the material from within the vessel by means of an electric current or by means of thermal contact with heated gases or vapors. The adsorption material may be subjected to heat while at rest or in motion through a regenerating chamber.

With the methods of regeneration used at present, it is not possible to so uniformly heat the material that all layers or portions thereof in the vessel have the same temperature. The unavoidable lack of uniformity in the temperature conditions of the different layers of the material treated has as a necessary incident the condensation of the vapors or gases set free in the hotter zones on the material in colder zones. By the time these colder zones are heated to the required temperature, the material in the zones reached first by the heat has as a rule been subjected to excessive heat, which means not only a disadvantage from the standpoint of economy, but above all, detrimentally affects the quality of the adsorption material and the substance dissociated from the latter by the heat.

Furthermore, the condensation of the adsorbed substances first driven off on the material in the colder zones causes the formation of a soft mass which in turn agglomerates the adsorption material into lumps. The result thereof is that these agglomerated portions can be regenerated only incompletely and by application of relatively large amounts of heat. In a system involving the movement of the material through a regenerating chamber, the formation of lumps may, moreover, cause clogging of the apparatus.

The present invention has as an object the elimination of the disadvantages just described and consists in the provision of apparatus wherein the adsorbed substances are removed as quickly as possible after they are liberated by the heat, and in the most direct way so that contact thereof with colder material is avoided.

For a better understanding of the invention reference is made to the accompanying drawing which is a diagrammatic representation of an apparatus constructed in accordance with the invention. In the drawing is shown a tubular regeneration system wherein is a chamber containing the adsorption material.

From the adsorption chamber $k$ the charged material passes through a gate $n$ into the regenerating chamber $a$ which consists in general of a plurality of tubes between a top header $a_4$ and a bottom header $a_5$. The chamber has an opening $d$ at the bottom. Above the top header $a_4$, and below the gate $n$ is provided a gas space $c_1$ which is formed of roof shaped elements, commonly used in the art for such purposes. There may be also arranged several gas spaces. The distribution and the position of the gas spaces may be modified in various ways. Intermediate the top and the bottom, preferably near the top, the tubes are in communication with gas spaces laterally thereof, connected by means of a conduit $g$ to a condenser $h$. While various forms of construction are possible, I preferably make the tubes of two sections, an upper section and a lower section, defining between them a gap. The adjoining ends of the sections are held in auxiliary headers $a_6$ and $a_7$. The header $a_6$ is disposed a short distance above the lower ends of the upper sections whereby a plurality of intercommunicating circular gas spaces $f$ are formed about the tubes. In addition, the lower ends of the upper sections may be expanded outwardly to form conical enlargements whereby the gas spaces are kept free of the adsorbing material. Similar gas spaces $c_2$ are formed around the lower ends of the lower tube sections. The scavenging gas, which may be carbon dioxide, nitrogen, steam—the latter preferably superheated—or another inert gas, passes through the conduit $e$ and then through conduits $e_1$ and $e_2$ to the gas spaces $c_1$ and $c_2$, respectively, and sweeps the liberated vapors with it at such a velocity that the liberated vapors are not excessively heated or subjected to chemical decomposition. The adsorbed substances liberated by the heat, principally in the lower section of the tubes, flow toward the gas spaces $f$ and then to the condenser where they are condensed. The scavenging gas is returned from the condenser, by a conduit $e_3$, to the conduit $e$. The inevitable loss in scavenging gas may be compensated for by a suitable source of supply connected to the scavenging circuit by means of pipe $p$.

By means of the scavenging circuit described, the cost of scavenging gas is reduced to a minimum and at the same time loss of distillate is avoided, as is obvious.

A blower 1 or other suitable pressure device is used for promoting circulation of the scavenging gas. I preferably insert this blower between the regenerating chamber and the condenser, whereby materially increasing the efficacy of the treatment inasmuch as the relatively low pressure in the regenerator facilitates the liberation of the gases while the relatively high pressure in the condenser promotes condensation.

As in the previously described arrangements, the gases liberated from the adsorption material do not pass through material of such temperature conditions that condensation could take place. Such gases as might be liberated in the upper zones flow from colder material through hotter material, while the temperature gradient between gas spaces $c_2$ and $f$ is bound to be relatively small.

Incident to the application of a scavenging gas, there is the danger of combustion in case the flow of scavenging gas should cease while heating of the material is continued. In order to practically eliminate this danger, I preferably make the application of heat to the regenerator chamber dependent upon the flow of the scavenging fluid. This may be done in various ways. For example, a diaphragm $m$ may be inserted in conduit $e$, so adjusted that when no scavenging gas is flowing, that is, when there is no pressure in the conduit, the diaphragm causes switch $r$ to close, thereby starting motor $s$ which disconnects blower $t$ supplying heated gas to the regenerating apparatus from heater $u$. By the correlation of the heating system and the scavenging gas circuit, a failure of the scavenging system causes a prompt cessation of the supply of heat.

The use of a scavenging gas, as described, has also a material advantage in that it affords a protection against explosion in the regenerating chamber. It may happen that interstices in the charged material passing into the regenerating chamber contain combustible gas mixtures which under the effect of the heat might cause serious explosions. By introducing the scavenging gas at the top of the regenerating chamber, that is, in the coldest zone, the pressure of the scavenging gas prevents the movement of any gas carried into the regenerating chamber by the charged material downwardly with the latter. While part of the scavenging gas may be lost in this way, the loss may be kept so small as to be practically negligible. It is understood that the scavenging gas introduced near the bottom of the regenerating chamber keeps out air that might otherwise enter through the material at outlet $d$.

It will be understood that in some respects the apparatus shown is but illustrative, and that the embodiments are capable of further modification without departing from the intended scope of the invention.

I claim:

1. Apparatus for regenerating charged adsorption material and for recovery of the adsorptively held gases or vapor comprising a regenerating chamber for receiving the material to be treated, means for indirectly heating the material within the chamber, said chamber including a plurality of vertically disposed tubes in parallel arrangement, a like plurality of tubes spaced therefrom in vertical alignment defining an intermediate gap, means defining a gas space about the tubes adjacent said gap and means for withdrawing gaseous products from said gas space.

2. Apparatus for regenerating charged adsorption material and for recovery of the adsorptively held gases or vapor comprising a regenerating chamber for receiving the material to be treated, means for indirectly heating the material within the chamber, said chamber including a plurality of tubes in parallel arrangement, means intermediate the ends of the tubes providing a separate gas space, the tubes being in communication with said gas space through openings in the wall thereof, means for withdrawing gaseous products from said gas space, means for forming gas spaces within the material beyond the ends of said tubes, and means for introducing a scavenging gas into said last named gas spaces.

3. Apparatus for regenerating charged adsorption material and for recovery of the adsorptively held gases or vapor comprising a regenerating chamber for receiving the material to be treated, means for indirectly heating the material within the chamber, said chamber including a plurality of tubes in parallel arrangement, means intermediate the ends of the tubes providing a separate gas space, the tubes being in communication with said gas space through openings in the wall thereof, means for withdrawing gaseous products from said gas space, means for forming gas spaces within the material beyond the ends of said tubes, means for introducing a scavenging gas into said last named gas spaces, and means for making said heating means ineffective when said scavenging gas ceases to flow.

In witness whereof, I affix my signature.

VITALIS PANTENBURG.